US009380633B2

(12) United States Patent
Toner (10) Patent No.: US 9,380,633 B2
(45) Date of Patent: Jun. 28, 2016

(54) METHOD AND SYSTEM FOR WLAN CONNECTION CONTROL

(71) Applicant: Roke Manor Research Limited, Romsey (GB)

(72) Inventor: Ben Toner, Alresford (GB)

(73) Assignee: Roke Manor Research Limited, Romsey Hampshire (GB)

( * ) Notice: Subject to any disclaimer, the term of this patent is extended or adjusted under 35 U.S.C. 154(b) by 91 days.

(21) Appl. No.: 14/054,050

(22) Filed: Oct. 15, 2013

(65) Prior Publication Data

US 2014/0105051 A1    Apr. 17, 2014

(30) Foreign Application Priority Data

Oct. 16, 2012   (GB) .................................. 1218641.7
Oct. 17, 2012   (GB) .................................. 1218690.4

(51) Int. Cl.
  *H04W 76/06*   (2009.01)
  *H04W 84/12*   (2009.01)
  *H04W 24/08*   (2009.01)

(52) U.S. Cl.
  CPC .............. *H04W 76/06* (2013.01); *H04W 24/08* (2013.01); *H04W 84/12* (2013.01)

(58) Field of Classification Search
  None
  See application file for complete search history.

(56) References Cited

U.S. PATENT DOCUMENTS

| 2003/0031154 | A1 | 2/2003 | Kobayashi et al. |
| 2004/0106403 | A1* | 6/2004 | Mori ................... H04L 12/5695 455/426.2 |
| 2005/0152305 | A1 | 7/2005 | Ji et al. |
| 2006/0002350 | A1 | 1/2006 | Behroozi |
| 2006/0233114 | A1 | 10/2006 | Alam et al. |
| 2007/0043676 | A1 | 2/2007 | Gao et al. |
| 2007/0155365 | A1* | 7/2007 | Kim ........................ H04L 65/80 455/410 |
| 2007/0208937 | A1* | 9/2007 | Cam-Winget et al. ........ 713/168 |
| 2008/0108348 | A1 | 5/2008 | Kottilingal et al. |
| 2009/0016247 | A1* | 1/2009 | Sood ............................. 370/310 |

FOREIGN PATENT DOCUMENTS

| EP | 2222117 A2 | 8/2010 |
| EP | 2309790 A2 | 4/2011 |
| WO | 2012106330 A1 | 8/2012 |

OTHER PUBLICATIONS

United Kingdom Search Report dated Feb. 14, 2013 in United Kingdom Application No. GB1218641.7.
European Search Report for EP 13 18 8387 dated Mar. 19, 2014.
Combined Search & Examination Report for Application No. GB1318063.3 dated Mar. 3, 2014.

* cited by examiner

*Primary Examiner* — Diane Lo
(74) *Attorney, Agent, or Firm* — Banner & Witcoff, Ltd.

(57) ABSTRACT

Embodiments of the invention proxy control the establishment or continued existence of a WLAN connection by using the back end authentication mechanism to authenticate/de-authenticate a WLAN session in dependence on the experienced quality of the connection during the set-up phase or session itself. This has the effect of preventing a bad quality connection from being established or from continuing, and hence should improve the user experience, and help a WLAN network operator maintain a service with high Quality of Service (QoS).

11 Claims, 5 Drawing Sheets

METHOD AND SYSTEM FOR WLAN CONNECTION CONTROL

CROSS REFERENCE TO RELATED APPLICATIONS

This application claims priority from United Kingdom Patent Application No. 1218641.7, filed on Oct. 16, 2012 and United Kingdom Patent Application No. 1218690.4, filed on Oct. 17, 2012. The entire disclosures of both applications are hereby incorporated by reference.

TECHNICAL FIELD

The present invention relates to a method and system for controlling connections made through wireless local access networks (WLAN), such as IEEE 802.11x (Wi-Fi) networks. Specific embodiments are directed at being used with wireless devices which do not provide sufficient user control of the WLAN connection manager, to provide an alternative mechanism for exerting control over which WLAN connections are made or maintained.

BACKGROUND TO THE INVENTION AND PRIOR ART

Many mobile wireless devices have the user experience fully defined by the device manufacturer. For example, devices using iOS® from Apple Corporation do not allow client applications to manage Wi-Fi connectivity. That is, the amount of control that is available through the Wi-Fi connection manager in the operating system to a third party application is limited, such that, for example, a third party application cannot force a connection to be dropped. Therefore, as WLAN use is not quality managed by the OS it is possible to connect to a poor WLAN service.

The trend in the industry, however, is for network operators to want to offer "always best connected" services, choosing between Wi-Fi and cellular at appropriate times. The issues noted above with local device WLAN management on some devices mean they cannot influence the device to enable such choices to be automatically implemented.

SUMMARY OF THE INVENTION

The present invention addresses the above noted problems by providing a method and system which provides a degree of proxy control of the WLAN connection of a mobile device by controlling a backend authentication server to either prevent a WLAN session being setup in the presence of unacceptable wireless connectivity conditions, or to de-authenticate an existing session (resulting in session tear-down) if a session already exists but wireless connectivity conditions deteriorate such that they become unacceptable. In this respect, de-authentication may encompass either complete de-authentication from the entire WLAN network, or where there is a WLAN network consisting of multiple Access Points with the same SSID, the de-authentication may just be the blocking of the device access to that access point. In some embodiments measurement of when wireless connectivity conditions via a particular WLAN are acceptable or unacceptable are made using known and predefined quality metrics, such as packet delay, jitter, and latency. In some embodiments the measurements may be made on the device itself, by a lightweight client application that sits on top of the operating system and monitors the performance of wireless connections that are made by the OS WLAN connection manager. In other embodiments the measurements may be made by the backend authentication server itself, particularly during authentication operations to setup a WLAN session. In yet further embodiments a dedicated quality server may be provided operated by the WLAN network operator, which provides a public interface, and which may receive via that interface quality metrics from the lightweight client on the device. The quality server then sends instruction messages via a private interface to the back-end authentication server to authenticate/de-authenticate a session. The advantage of having the quality server with the public interface to receive the messages from the device client and a private interface to interact with the authentication server is that security is increased, as the lightweight device client does not need to authenticate itself with the authentication server.

Overall, however, embodiments of the invention indirectly control the establishment or continued existence of a WLAN connection by using the back end authentication mechanism to authenticate/de-authenticate a WLAN session in dependence on the experienced quality of the connection during the set-up phase or session itself. This has the effect of preventing a bad quality connection from being established or from continuing, and hence should improve the user experience, and help a WLAN network operator maintain a service with high Quality of Service (QoS).

In view of the above, from one embodiment there is provided a method of controlling a WLAN connection, comprising using a back-end authentication mechanism to de-authenticate a wireless device using the connection in dependence on the quality of the connection.

Another embodiment also provides a system for controlling a WLAN connection, comprising a back-end authentication server arranged to de-authenticate a wireless device using the connection in dependence on the quality of the connection.

Further features and aspects of the invention will be apparent from the appended claims.

BRIEF DESCRIPTION OF THE DRAWINGS

Further features and advantages of the present invention will become apparent from the following description of an embodiment thereof, presented by way of example only, and by reference to the drawings, wherein like reference numerals refer to like parts, and wherein.

DESCRIPTION OF THE EMBODIMENTS

Five embodiments of the invention will now be described, by way of example only. Each of the five embodiments make use of the Extensible Authentication Protocol, defined in RFC 3748 and RFC 5247, to allow for authentication of a mobile wireless device 10, such as a smartphone, tablet, laptop, or the like, with a wireless local area (or access) network (WLAN) access point (AP) 20 to enable internet connectivity via the WLAN access point. The WLAN AP 20 is operated by a network operator, which maintains a backend authentication server 30, such as a RADIUS server, to provide authentication and access control mechanisms for the WLAN AP 20. Authentication of the device 10 to obtain connectivity through the WLAN AP 20 is preferably performed between the device 10 and the authentication server 30 using the EAPOL (EAP Over LANS) protocol defined in IEEE 802.1X, although other EAP based protocols may be used depending on the precise application, such as EAP-SIM (defined in RFC 4186), EAP-AKA (defined in RFC 4187), EAP-AKA' (defined in RFC 5448), for example. In addition, in other embodiments any similar authentication protocol providing similar functionality may be used, and embodiments of the invention are not limited to the above. The WLAN AP 20 typically provides wireless connections commonly known as "Wi-Fi" connections, usually operating in accordance with the IEEE 802.11 family of standards. Sometimes the acronym WLAN is referred to as wireless local area networks; in the context of the present invention these are the same as wireless local access networks, and the terms are interchangeable herein.

Figure 1:
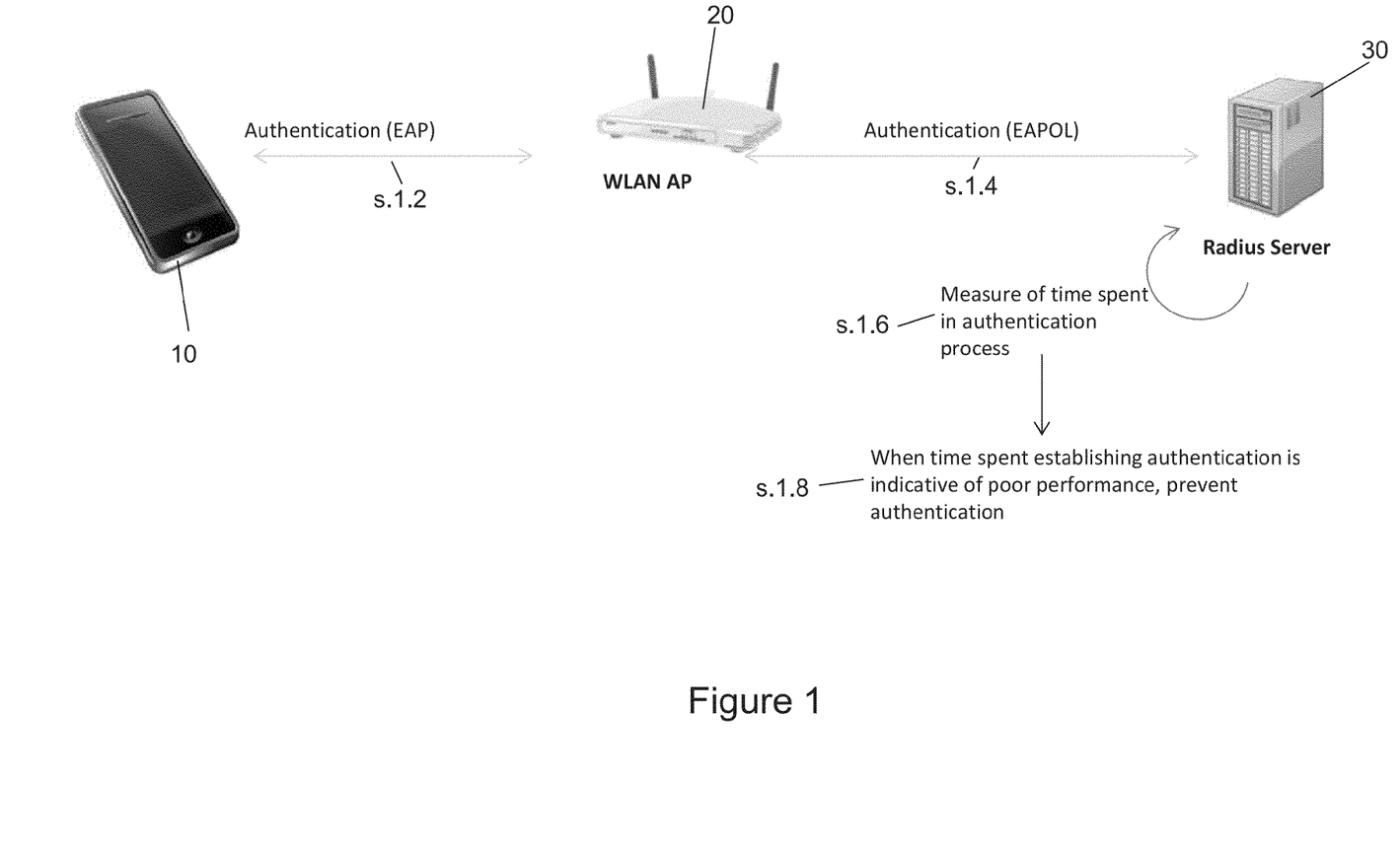
FIG. 1 is a diagram illustrating a first embodiment of the invention relating to WLAN session setup.

The operation of the authentication protocol used is to permit the device 10 to request authentication and permission to connect to the WLAN AP 20 at step 1.2, and for the WLAN AP 20 to then check that the device is authenticated and permitted to connect via the WLAN AP 20 with the backend authentication server 30, at step 1.4. The precise details of the authentication processes used are beyond the scope of the present specification, but examples are taught in the above noted standards and RFCs. The important operation of the authentication process in the context of the present embodiments, however, is that if, on session set-up the authentication server fails to authenticate the mobile device 10, then the device is refused connection to the WLAN AP 20. This prevents the device from connecting to WLAN 20, and hence should force the device (or its user) to select another access network method (for example via a cellular connection, if available, or another, stronger, Wi-Fi connection) Likewise, if during a session the back end authentication server de-authenticates the mobile device 10, then this should cause the WLAN AP 20 to tear down the device 10 connection session, which again should cause the device or the user to try to select an alternative connection method. In addition, logical rules may also be provided to determine when to re-allow a device to authenticate, for example after a timeout or when it has significantly changed location.

Regarding how de-authentication may occur, one of two methods may be used. Firstly, a Disconnect or COA (Change of Authorisation) technique as described in RFC 3576 may be utilised. If COA was used, this would prompt re-authentication and to achieve a disconnection attempt the logic in the back-end authentication server (e.g. a Radius server) would be to deny a connection for that user. A second method is to block access of a particular mobile device at a particular access point—this would be a proprietary manufacturer specific implementation In view of the above, FIG. 1 shows a first embodiment of the invention. Here, mobile device 10 wishes to try and set up a connection session with WLAN AP 20, and hence uses the EAP based authentication methods described above at steps 1.2 and 1.4. As a consequence, the backend authentication server 30 receives a request to authenticate the device 10, and commences authentication with the device 10. However, at the same time, a timer process is started in the authentication server to measure the time taken for the authentication process, on the basis that if the WLAN connection between the AP and the device is of low quality, throughput across the connection will be low and the authentication process will take longer than usual. Therefore, if the timer process indicates that the time taken to complete the authentication process is longer than usual, or if some other aspect of the message exchange that takes place during the authentication process indicates that the WLAN connection performance is poor (for example if packet delay or jitter is high), then the authentication process is terminated at the backend authentication server end, and the device is prevented from authenticating with and hence connecting to the network. As noted above, this prevents the device from connecting to a poorly performing wireless network (for example because the device is at the edge of the network range), and should cause the device or its user to seek alternative connections.

In some embodiments the time measured by the timer process can be an allowable time that is derived from a user preference. For example, if a user wants to save money and use less cellular data, then they will tolerate a slower WLAN connection and so would accept a longer time out. If a user has a plan for speed and unlimited data, then they would likely be less tolerant of slow WLAN and would prefer a shorter timeout. The timeout length measured by the timer process can therefore be set in dependence upon or as a function of a user preference set on the device as to whether they are willing to "accept slow WLAN connections". This might simply be a user preference in the device set-up menus, where if selected a first timeout length is selected, which is longer than a second timeout length that is used if the user preference is not selected. Of course, the opposite functionality is also possible, in that the user preference may be to "use fast WLAN connections", in which case the lower timeout time is used if the preference is selected, and vice versa.

In addition, in some embodiments it is possible to assess the timeout according to other networks present to the device. The other network information may come from the device reports of available networks, sent at the time the quality information is sent. Alternatively, knowing the location of the device, the operator can infer what other networks are about.

In this case there may be a short timeout when fast cellular networks such as LTE networks are available (for example) then the device should only connect to Wi-Fi if it is expected to be at least as good as the fast cellular network such as LTE (depending on the user's spending preferences as described above). If there is no LTE network present, then a longer timeout may be acceptable as a lower quality Wi-Fi connection is usually acceptable when only 3G or 2G networks are the alternative.

Within the above, therefore, measurements indicative of the quality of the WLAN connection are taken at the backend authentication server, and if these measurements indicate that the connection is of poor quality, the authentication process is used to refuse a connection of the device to the WLAN. Therefore, whilst the connection manager on the device 10 may not be directly controlled, by refusing connections the device may be indirectly controlled by proxy to select another available connection.

Figure 2:
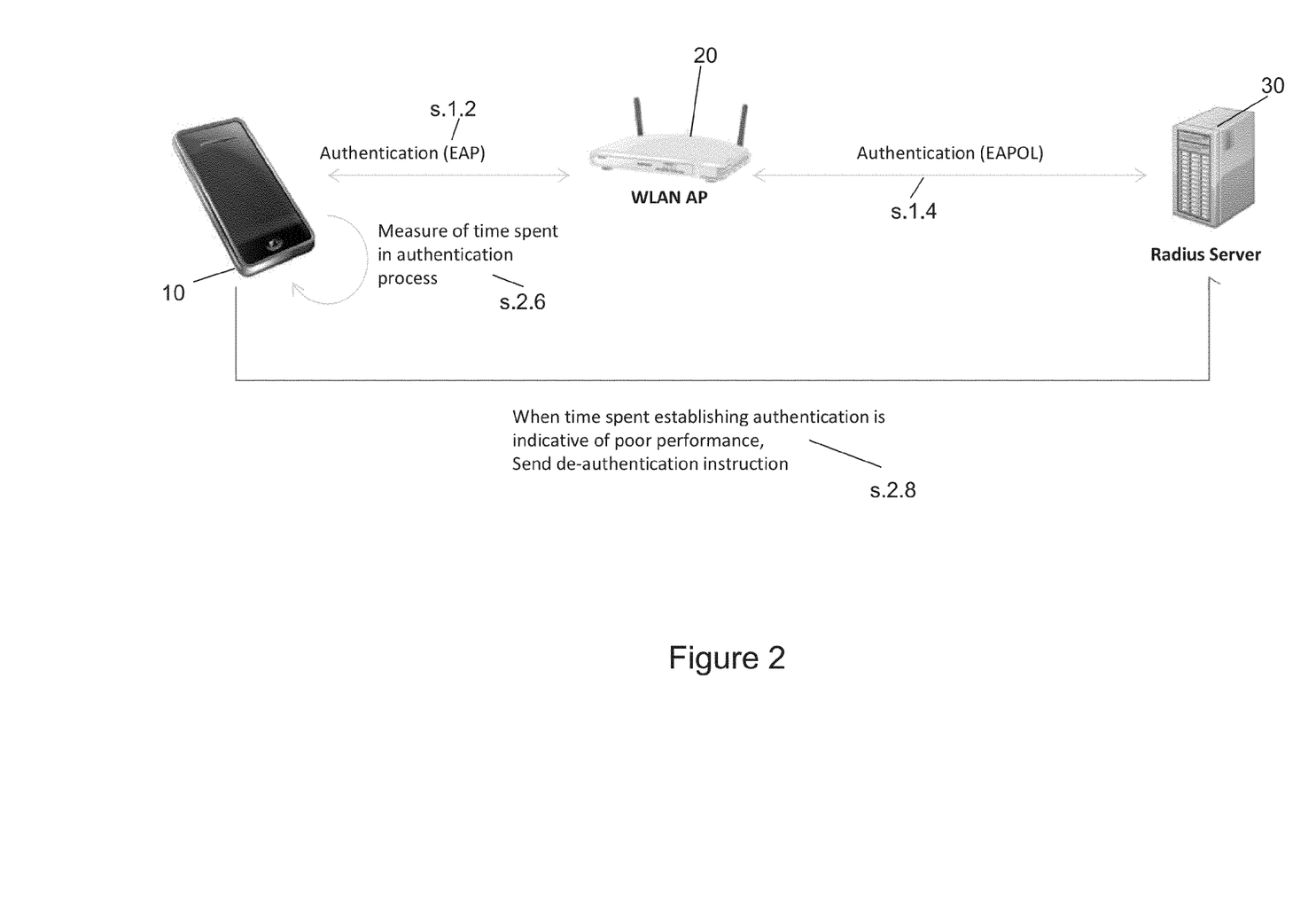
FIG. 2 is a diagram illustrating a second embodiment of the invention relating to WLAN session setup.

FIG. 2 illustrates a further embodiment of the invention. Here, the device 10 attempts (via the WLAN connection manager in the OS) to authenticate with and connect to WLAN AP 20, in the same manner as before. However, in contrast with the first embodiment, in the second embodiment a lightweight WLAN monitoring client application (not shown) is installed on the device, which runs on top of (i.e. outside) the OS, independently of the OS WLAN connection manager, and which acts to monitor attempts to connect and connections made to WLAN networks. In the second embodiment when the connection and authentication process is started the lightweight WLAN monitoring client application starts to measure the time spent in the authentication process, at step 2.1. Again, this measurement is made on the basis that if the WLAN connection between the AP and the device is of low quality, throughput across the connection will be low and the authentication process will take longer than usual. Therefore, if the WLAN monitor process measures that the time taken to complete the authentication process is longer than usual, or if some other aspect of the message exchange that takes place during the authentication process indicates that the WLAN connection performance is poor (for example if packet delay or jitter is high), then the client application sends a message (at step 2.8) to the backend authentication server, instructing the server to prevent the authentication process from completing. As in the first embodiment, this should prevent the device from connecting to the wireless network, and should cause the device or its user to seek alternative connections.

Within the above, therefore, measurements indicative of the quality of the WLAN connection are taken at the WLAN monitoring client application running on the mobile device 10, and if these measurements indicate that the connection is of poor quality, the backend authentication process is instructed by the client to refuse a connection of the device to the WLAN. Therefore, whilst the connection manager on the device 10 may not be directly controlled by the WLAN monitoring application, by causing the backend authentication server to refuse connections the device may be indirectly controlled to select another available connection.

One problem with the second embodiment is that the backend authentication server 30 lies within the network of the network operator, and for security reasons should not really present any unsecured open public interfaces. Therefore, receiving a message directly from the WLAN monitoring client application on the device should not be allowed in secure implementations, without the client having first to authenticate itself to the backend authentication server. Whilst this is possible, it may itself take quite a bit of time, and may actually prove impossible if the WLAN connection is so bad that the throughput is very low.

Figure 3:
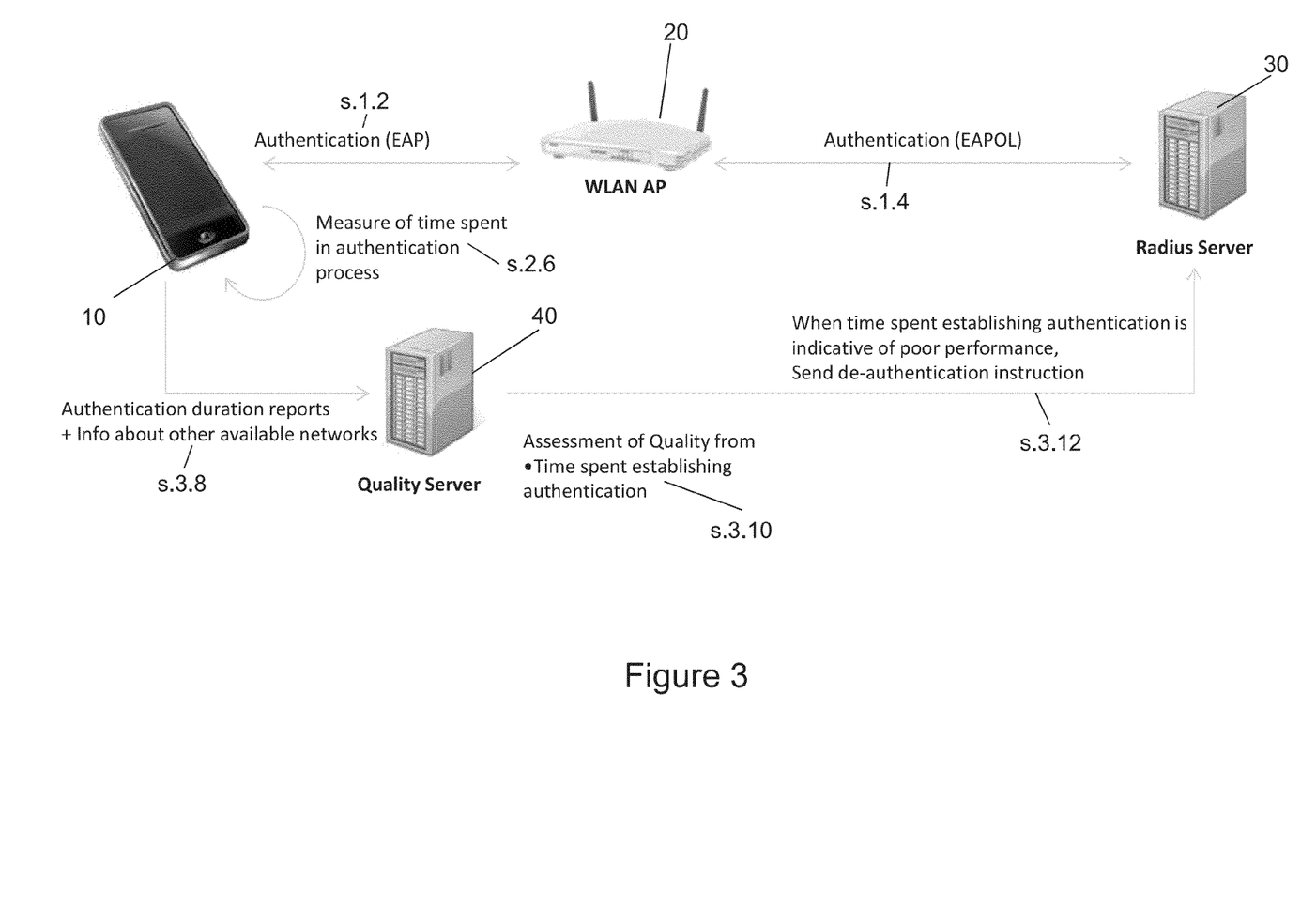
FIG. 3 is a diagram illustrating a third embodiment of the invention relating to WLAN session setup.

To get around the above problem, therefore, the embodiment of FIG. 3 introduces a quality server 40, operated by the WLAN network operator, and which receives reports with quality metrics from the WLAN monitoring application. The quality metrics may be standard quality metrics, such as packet delay and jitter, as are known in the art. In addition, the WLAN monitoring application may send details of other connections or WLAN networks that are available to the device. The quality server 40 then decides, on the basis of the quality metrics received, whether the authentication process is taking too long, and if so instructs the back authentication server 30 to refuse to authenticate the device 10. This should then cause the connection attempt to be aborted, and cause the device to seek an alternative connection elsewhere, or to try to connect again at a later time.

More particularly, the operation of the third embodiment is as follows:

1. The device client is in range of a WLAN AP and attempts to authenticate to the service (automatically with the standard connection manager) (s.1.2 and 1.4).

2. The client notices an attempt to authenticate and times the process. Very frequent reports are sent to the quality server over the cellular network. (s.2.6 and 3.8)

3. The server 40 monitors the device reports and also measures the jitter on the scheduled delivery of the reports. (s.3.10)

4. The server 40 has a threshold for when the authentication time is too long and indicates a poor service. (s.3.12)

5. The server 40 sends a message to the network operator's authentication server 30 (Radius, AAA) to stop the authentication attempt (s.3.12)

6. The server (30) sends a response to the report delivery to indicate authentication has been abandoned.

7. The Wi-Fi connection on the device is not established at that time.

8. The connection manager (if possible on the device APIs) can be scheduled to try again, or to try a different connection.

Within the above, therefore, measurements indicative of the quality of the WLAN connection are taken at the WLAN monitoring client application running on the mobile device 10, and then sent to the quality server. The quality server then decides, based on these measurements that the connection is of poor quality, and instructs the backend authentication server to refuse a connection of the device to the WLAN. Therefore, whilst the connection manager on the device 10 may not be directly controlled by the WLAN monitoring application, by causing the backend authentication server to refuse connections the device may be indirectly controlled to select another available connection. Moreover, using the quality server allows security to be maintained, as the decision to prevent authentication is taken by an entity that is trusted and within the control of the network operator.

The previous embodiments focus on when a connection is being set-up. The next embodiments focus on when a connection has already been established, but the connection quality has dropped such that poor quality is obtained. Such an eventuality might arise if, for example, the mobile device has moved location since the connection was first established.

Figure 4:
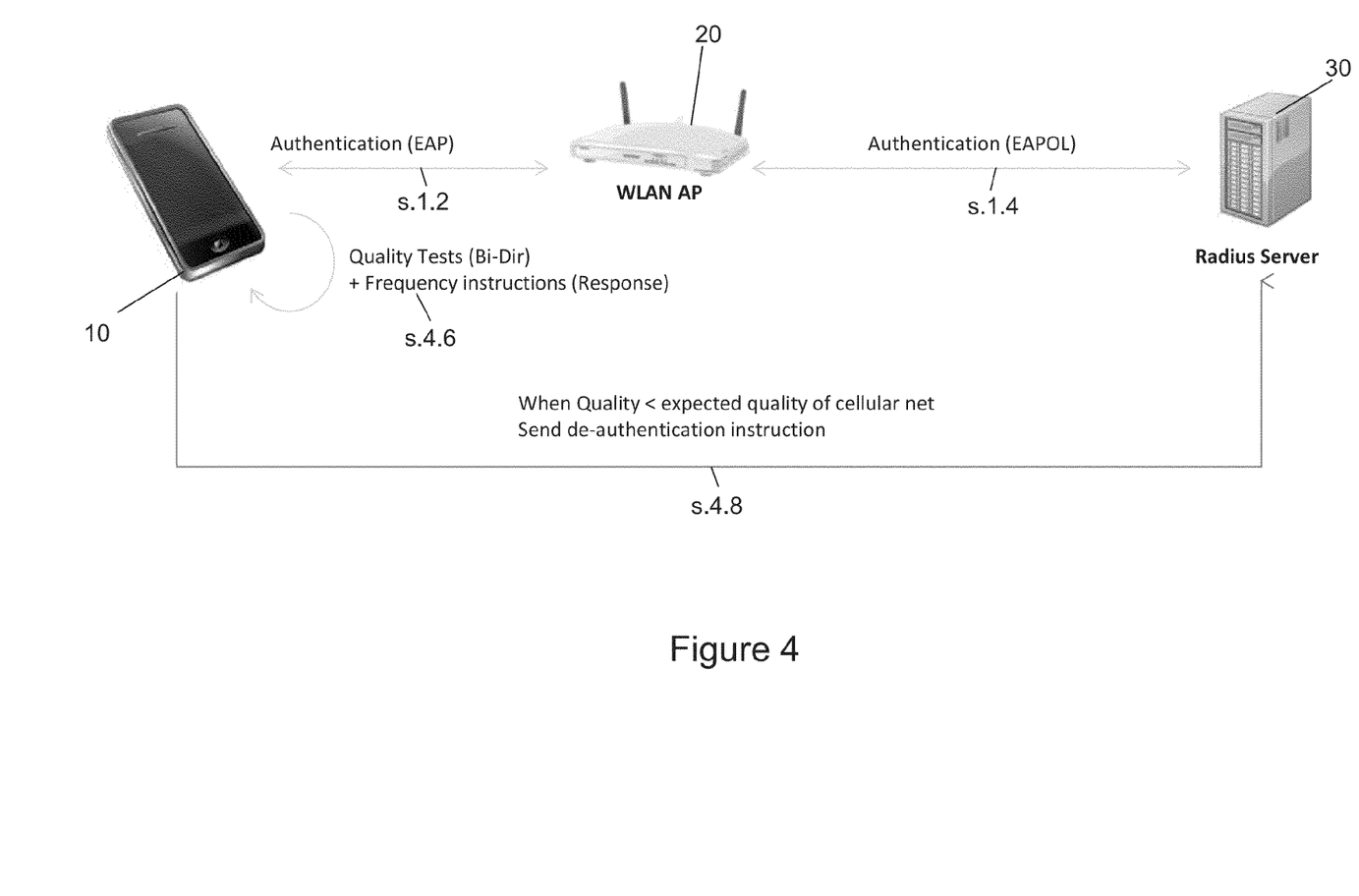
FIG. 4 is a diagram illustrating a fourth embodiment of the invention relating to WLAN disconnection.

Within FIG. 4 assume that the mobile device 10 has already successfully authenticated with the WLAN AP 20, and the backend authentication server 30, and a connection has been established. In order to monitor the quality of the connection a lightweight WLAN monitoring client application (not shown) is provided, running on top of the OS. The WLAN monitoring application is therefore separate from the connection manager in the OS.

The device WLAN monitoring client application retrieves information from an end point. Typically the end point is a web server and the information is HTTP headers that identify the end-point and can carry some information. The information is used to assess quality of the connection, and derive some quality metrics for the connection, such as delay, jitter, and latency, for example. These quality metrics are monitored, and when they reach a threshold indicating poor quality of the connection, or if it is estimated that better quality may be obtained via an alternative connection (such as a cellular connection), then a de-authentication instruction is sent from the client application to the backend authentication server 30. As described previously, receipt of this instruction causes the backend authentication server to de-authenticate the device, which in turn causes the WLAN AP 20 to tear down the connection session between itself and the device, and hence prevent further connectivity of the device therethrough. As in previous embodiments, this should then cause the connection manager in the OS to seek alternative connections.

With the above, therefore, even once a connection has been established it becomes possible to indirectly control the device via the backend authentication server so that a poor connection is not persisted with.

Figure 5:
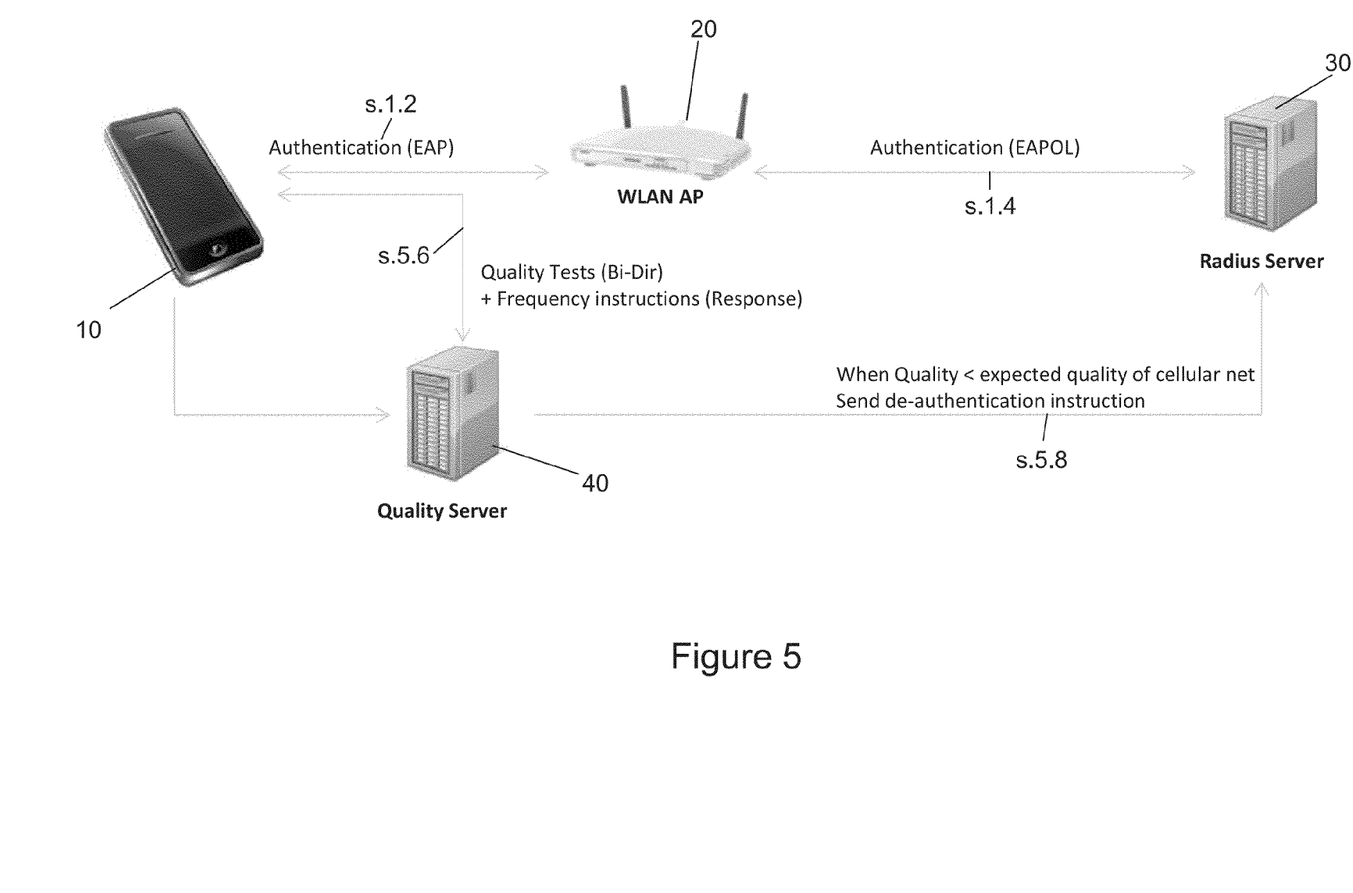
FIG. 5 is a diagram illustrating a fifth embodiment of the invention relating to WLAN disconnection.

The fourth embodiment, however, possesses the same security drawbacks as the second embodiment described above, with respect to allowing the WLAN monitoring application on the device to send de-authentication instructions to the backend authentication server 30. Therefore, to get around this problem, in a fifth embodiment a quality server 40 is introduced between the client monitoring application and the backend server. The quality server 40 receives quality reports from the client application on the device, and takes decisions based on the quality metrics in the reports. In addition, it also measures quality metrics itself, such as the jitter on the scheduled delivery of the reports. Based on the quality metrics the server decides whether the WLAN connection has degraded to the extent that it is now unacceptable (for example, packet delay and/or jitter exceed known thresholds), and if it is decided that the connection quality is unacceptable an instruction is sent to the backend authentication server to de-authenticate the device. As before, this causes the WLAN AP 20 to tear down the connection session between itself and the device, and hence prevent further connectivity of the device therethrough. As in previous embodiments, this should then cause the connection manager in the OS to seek alternative connections.

In more detail, one version of the fifth embodiment operates as follows:

1. The device client retrieves information from a end point. Typically the end point is a web server and the information is HTTP headers that identify the end-point and can carry some information. The information is used to assess quality of the connection, which is then reported periodically to the server.

2. The server monitors the device reports and also measures the jitter on the scheduled delivery of the reports.

3. The server uses standard QoS assessment algorithms to determine when QoS is degrading.

4. The server responses to the client on the device include a quality assessment frequency (e.g. in the web page headers) which rises as QoS begins to degrade and more granular information is required.

5. When the QoS of the attached Wi-Fi network is determined to unacceptable (i.e. QoS metrics below thresholds), or to be less than the alternative cellular network (which may come from location info if the device cannot monitor it directly), a decision is made to disconnect the device from the WLAN.

6. The server sends a message to the network operator's authentication server (e.g. Radius, AAA) to de-authenticate the device.

7. The Wi-Fi connection on the device is lost (following which the cellular connection may be selected by the standard connection manager within the device).

The fifth embodiment therefore provides the advantages of the fourth embodiment, but with the security advantages of the quality server, which means that the authentication server need not have any open, unsecured interfaces.

As will be apparent from the above, embodiments of the invention make use of the authentication mechanism used in some WLAN arrangements to indirectly control the connections that a wireless device makes, by either refusing to authenticate the device or de-authenticating a device which is suffering from a poor quality WLAN connection. This therefore forces the device the seek an alternative connection, which may be a cellular connection, or alternative WLAN. The advantage of the invention is that is allows a WLAN operator to manage any mobile device Wi-Fi access dynamically to always offer the best network connection. With this concept, there is a separation in the ownership of user experience between the device manufacturer and the network operator.

Various modifications may be made to the above described embodiments to provide further embodiments, any and all of which are intended to be encompassed by the appended claims.

The invention claimed is:

1. A method of controlling a wireless local access network (WLAN) connection between a wireless device and a WLAN access point, the method comprising:
   measuring an experienced quality of the WLAN connection to determine one or more quality metrics relating to the WLAN connection;
   deciding, using a quality server, whether to de-authenticate the wireless device in dependence on the one or more quality metrics; and
   using a back-end authentication server to de-authenticate the wireless device using the WLAN connection to the WLAN access point, if the quality server decides to de-authenticate the wireless device,
   wherein the de-authentication causes termination of the WLAN connection.

2. A method according to claim 1, wherein the one or more quality metrics include one or more of: packet delay, jitter, latency, or time taken to complete an authentication operation.

3. A method according to claim 1, comprising:
   sending an instruction message to the back-end authentication server to de-authenticate the wireless device.

4. A method according to claim 3, wherein the instruction message is sent by the quality server
   in dependence on the one or more quality metrics.

5. A method according to claim 1, comprising:
   measuring the experienced quality, at the wireless device, to determine at least one of the one or more quality metrics relating to the WLAN connection; and
   sending the one or more quality metrics to the quality server.

6. A system for controlling a wireless local access network (WLAN) connection between wireless devices and WLAN access points, the system comprising:
   a quality server arranged to decide whether to de-authenticate a wireless device in dependence on one or more quality metrics; and
   a back-end authentication server arranged to de-authenticate the wireless device using the WLAN connection if the quality server decides to de-authenticate the wireless device,
   wherein the de-authentication by the back-end authentication server causes termination of the WLAN connection.

7. A system according to claim 6, wherein the system further comprises:
   a quality metric calculator arranged to determine the one or more quality metrics relating to the WLAN connection.

8. A system according to claim 6, wherein the one or more quality metrics include one or more of: packet delay, jitter, latency, or time taken to complete an authentication operation.

9. A system according to claim 6, comprising:
   a quality metric calculator arranged to measure an experienced quality to determine the one or more quality metrics relating to the WLAN connection; and
   a message interface arranged to send the one or more quality metrics to the quality server.

10. A method of controlling a set-up of a wireless local access network (WLAN) connection between a wireless device and a WLAN access point, the method comprising:
    establishing an initial connection between the wireless device and the WLAN access point;
    measuring an experienced quality of the initial connection to determine one or more quality metrics relating to the initial connection;

deciding, using a quality server, whether to prevent an authentication process from completing in dependence on the one or more quality metrics; and using a back-end authentication server to prevent the authentication process from completing, if the quality server decides to prevent authentication, thereby preventing the set-up of the WLAN connection.

11. A system for controlling a set-up of a wireless local access network (WLAN) connection between wireless devices and WLAN access points, the system comprising:

a quality server arranged to decide whether to prevent an authentication process from completing in dependence on one or more quality metrics; and a back-end authentication server arranged to prevent the authentication process from completing if the quality server decides to prevent the authentication process from completing, thereby preventing the set-up of the WLAN connection.

\* \* \* \* \*